(12) United States Patent

Suwa et al.

(10) Patent No.: US 8,399,541 B2
(45) Date of Patent: Mar. 19, 2013

(54) ACTIVE ENERGY RAY-CURABLE INK COMPOSITION AND PRINTED MATTER

(75) Inventors: Yukie Suwa, Sakura (JP); Hiroshi Kinoshita, Chiba (JP); Tatsushi Okuda, Minamisaitama-gun (JP); Sei Yamamoto, Tokyo (JP)

(73) Assignee: DIC Corporation, Tokyo (JP)

( * ) Notice: Subject to any disclaimer, the term of this patent is extended or adjusted under 35 U.S.C. 154(b) by 180 days.

(21) Appl. No.: 12/922,901

(22) PCT Filed: Mar. 18, 2009

(86) PCT No.: PCT/JP2009/055271

§ 371 (c)(1),
(2), (4) Date: Sep. 16, 2010

(87) PCT Pub. No.: WO2009/119400

PCT Pub. Date: Oct. 1, 2009

(65) Prior Publication Data

US 2011/0014438 A1 Jan. 20, 2011

(30) Foreign Application Priority Data

Mar. 28, 2008 (JP) ................................. 2008-086287

(51) Int. Cl.
*C09D 11/10* (2006.01)

(52) U.S. Cl. ........ 523/160; 523/202; 523/206; 522/184; 524/556

(58) Field of Classification Search .................. 522/184; 523/160, 202, 206; 524/556

See application file for complete search history.

(56) References Cited

U.S. PATENT DOCUMENTS

| 6,262,152 | B1 * | 7/2001 | Fryd et al. ........................ 524/90 |
| 2007/0259986 | A1 * | 11/2007 | Elwakil et al. ................... 522/83 |
| 2009/0156730 | A1 * | 6/2009 | Cha et al. ....................... 524/505 |

FOREIGN PATENT DOCUMENTS

| JP | 01-040566 A | 2/1989 |
| JP | 2002-309142 A | 10/2002 |
| JP | 2003-342514 A | 12/2003 |
| JP | 2004-002501 A | 1/2004 |
| JP | 2007-002242 A | 1/2007 |
| JP | 2007-185883 A | 7/2007 |

OTHER PUBLICATIONS

International Search Report dated Jun. 9, 2009, issued in PCT/JP2009/055271.

* cited by examiner

*Primary Examiner* — Vu A Nguyen
(74) *Attorney, Agent, or Firm* — Edwards Wildman Palmer LLP; James E. Armstrong, IV

(57) ABSTRACT

Disclosed is an active energy ray-curable ink composition comprising a coloring agent, a binder resin, and a radically polymerizable varnish and/or a radically polymerizable monomer as main components. The coloring agent is a modified pigment wherein the surface of a pigment (A) is provided with a polymer (P) which is obtained by polymerizing a polymer (B), which is soluble in nonaqueous solvents, with at least one polymerizable unsaturated monomer (C), which is originally soluble in nonaqueous solvents but becomes insoluble or poorly soluble after polymerization. Also disclosed is a printed matter which has a coating film obtained by curing and drying the active energy ray-curable ink composition.

12 Claims, No Drawings

ACTIVE ENERGY RAY-CURABLE INK COMPOSITION AND PRINTED MATTER

TECHNICAL FIELD

The present invention relates to an active energy ray-curable ink composition used for printing on a substrate such as paper, plastic sheets and the like by using an offset printing machine.

BACKGROUND ART

An active energy ray-curable ink has been characterized as an ink exhibiting excellent environment friendly printing and excellent printing efficiency as well as providing printed matter of a high quality since the ink is of solvent-free type and is cured and dried instantly by radiation of active energy rays. Accordingly, such an active energy ray-curable ink has been developed for use in a variety of printing methods such as offset printing, screen printing, flexographic printing, and/or inkjet printing (for example, please refer to Patent Document 1).

The active energy ray-curable ink is generally obtained by mixing a dry pigment with a radical polymerizable varnish, a radical polymerizable monomer, a photopolymerization initiator and the like, followed by kneading and dispersion by using a roll mill or the like. However, there has been problems such that the method might cause gelatinization when the radical polymerizable varnish and/or the radical polymerizable monomer are kneaded and dispersed by a roll mill under a strong shearing force, and that it normally takes more than 24 hours for dispersion by a roll mill.

Moreover, even though such a long time has been spent on preparation, pigment dispersibility is poor and printability is occasionally poor when the obtained ink is utilized in offset printing.

As a method for obtaining an active energy ray-curable ink without using roll mills, an active energy ray-curable ink using a dispersed element of pigment obtained by dispersing a pigment in a radical polymerizable varnish using a flushing method has been known (for example, please refer to Patent Reference 2). However, this method requires a special varnish in which a value of n-hexane tolerance is adjusted to be 4 or more.

[Patent Document 1] Japanese Unexamined Patent Application, First Publication No. 2002-309142

[Patent Document 2] Japanese Unexamined Patent Application, First Publication No. 2003-342514

DISCLOSURE OF INVENTION

Problems to be Solved

The present invention is intended to solve the above problems and to provide an active energy ray-curable ink which is dispersed easily and which has excellent color density and gloss, as well as exhibiting excellent printability when utilized in offset printing.

Means to Solve the Problems

The present inventors have found that an active energy ray-curable composition using a coloring agent to which specific treatments have been applied can be dispersed without a strong shearing force being applied thereto by roll mills or the like, and that the composition has an excellent printability especially as an offset ink.

That is, the present invention provides an active energy ray-curable ink composition which comprises a coloring agent, a binder resin, and a radically polymerizable varnish and/or a radically polymerizable monomer as main components, wherein the coloring agent is a modified pigment wherein the surface of a pigment (A) is provided with a polymer (P) which is obtained by polymerizing a polymer (B), which is soluble in nonaqueous solvents, with at least one kind of polymerizable unsaturated monomer (C), which is originally soluble in a nonaqueous solvents but becomes insoluble or poorly soluble after polymerization.

Also disclosed by the present invention is an active energy ray-curable ink composition which comprises a coloring agent, a binder resin, and a radically polymerizable varnish and/or a radically polymerizable monomer as main components, wherein the coloring agent is a modified pigment obtained by polymerizing at least one kind of polymerizable unsaturated monomer (C) which is originally soluble in the nonaqueous solvents but becomes insoluble or poorly soluble after polymerization, in the existence of a pigment (A) and a polymer (B) which is soluble in nonaqueous solvents.

Effects of Invention

According to the present invention, such an active energy ray-curable ink can be obtained that is easily dispersed and exhibits excellent color density and gloss in the resultant ink, as well as that shows an excellent printability upon offset printing. Since the modified pigment used in the present invention can be dispersed easily, inks can easily be prepared by using a planetary mixer.

BEST MODE FOR CARRYING OUT THE INVENTION (Coloring Agent)

The coloring agent used in the present invention is a modified pigment obtained in the existence of a pigment (A) and a polymer (B), which is soluble in nonaqueous solvents, by polymerizing at least one kind of a polymerizable unsaturated monomer (C), which is originally soluble in the nonaqueous solvents but becomes insoluble or poorly soluble after polymerization. To be more precise, the coloring agent is a modified pigment wherein the surface of the pigment (A) is provided with a polymer (P) which is obtained by polymerizing the polymer (B), which is soluble in nonaqueous solvents, with at least one kind of polymerizable unsaturated monomer (C), which is originally soluble in nonaqueous solvents but becomes insoluble or poorly soluble after polymerization.

The polymer (P) is used as a generic name of polymer which finally coats the modified pigment. To be more precise, the polymer (P) refers generically to the resultant polymers of the polymer (B) and polymerizable unsaturated monomer (C).

(Coloring Agent: Pigment (A))

A pigment (A) used in the present invention is at least one kind of pigment selected from publicly known and widely employed organic pigments or inorganic pigments. Also, the present invention can be applied to either untreated pigment or treated pigment.

Examples of the organic pigments include a perylene based or perynone based pigment, a quinacridone based compound pigment, a phthalocyane based compound pigment, an anthraquinone based compound pigment, a phthalon based compound pigment, a dioxazine based compound pigment, an isoindolinone compound pigment, a methine based or azomethine based compound pigment, a diketo-pyrrolo-pyrrole based compound pigment, an insoluble azo compound pigment, a soluble azo compound pigment, a condensed azo compound pigment, and the like. Concrete examples of the organic pigments are as follows.

For the perylene based or perynone based pigment, pigments such as C.I. Pigment Violet 29, C.I. Pigment Red 123, 149, 178 and 179, C.I. Pigment Black 31 and 32, and C.I. Pigment Orange 43 and the like may be listed, for example.

For the quinacridone based compound pigment, pigments such as C.I. Pigment Violet 19 and 42, C.I. Pigment Red 122, 202, 206, 207 and 209, and C.I. Pigment Orange 48 and 49 and the like may be listed, for example.

For the phthalocyane based compound pigment, pigments such as C.I. Pigment Blue 15, 15:1, 15:2, 15:3, 15:4, 15:6 and 16, and C.I. Pigment Green 7 and 36 and the like may be listed, for example.

For the anthraquinone based compound pigment, pigments such as C.I. Pigment Blue 60, C.I. Pigment Yellow 24 and 108, C.I. Pigment Red 168 and 177, and C.I. Pigment Orange 40 and the like may be listed, for example.

For the phthalon based compound pigment, pigments such as C.I. Pigment Yellow 138 and the like may be listed, for example.

For the dioxazine based compound pigment, pigments such as C.I. Pigment Violet 23, 37 and the like may be listed for example.

For the iso-indolinone based compound pigment, pigments such as C.I. Pigment Yellow 109, 110 and 173, and C.I. Pigment Orange 61 and the like may be listed for example.

For the methine based and azomethine based compound pigment, pigments such as C.I. Pigment Yellow 139 and 185, C.I. Pigment Orange 66, and C.I. Pigment Brown 38 and the like may be listed for example.

For the diketo-pyrrolo-pyrrole based compound pigment, pigments such as C.I. Pigment Red 254, 255 and the like may be listed for example.

For the insoluble azo compound pigment, pigments such as C.I. Pigment Yellow 1, 3, 12, 13, 14, 17, 55, 73, 74, 81, 83, 97, 130, 151, 152, 154, 156, 165, 166, 167, 170, 171, 172, 174, 175, 176, 180, 181 and 188, C.I. Pigment Orange 16, 36 and 60, C.I. Pigment Red 5, 22, 31, 112, 146, 150, 171, 175, 176, 183, 185, 208 and 213, C.I. Pigment Violet 43 and 44, and C.I. Pigment Blue 25, 26 and the like may be listed for example.

For the soluble azo compound pigment, pigments such as C.I. Pigment Red 53:1, 57:1, 48 and the like may be listed for example.

For the condensed azo compound pigment, pigments such as C.I. Pigment Yellow 93, 94, 95, 128 and 166, C. I. Pigment Orange 31, C.I. Pigment Red 144, 166, 214, 220, 221, 242, 248 and 262, and C.I. Pigment Brown 41, 42 may be listed for example.

Examples of the inorganic pigment include titanium oxide, zinc sulfide, white lead, zinc white, lithobon, antimony white, basic lead sulfate, basic lead silicate, barium sulfate, calcium carbonate, gypsum, silica, carbon black, iron black, cobalt violet, vermilion, molybdenum orange, red lead, red iron oxide, chrome yellow, cadmium yellow, zinc chromate, yellow ochre, chromium oxide, ultramarine blue, Berlin blue, cobalt blue and the like.

According to the present invention, the organic pigments are especially preferable for demonstrating the advantageous effect of the present invention, and it is especially preferable to use the quinacridone based compound pigment, the phthalocyane based compound pigment, the insoluble azo compound pigment, and the condensed azo compound pigment.

(Nonaqueous Solvents)

The nonaqueous solvents used in the present invention are organic solvents in which aliphatic and/or alicyclic hydrocarbonic solvents are essentially included. Examples of the aliphatic and/or alicyclic hydrocarbon solvents include n-hexane, n-heptane, "LAWS" or "Mineral Split EC" manufactured by Shell Chemicals, "Isopar C", "Isopar E", "Isopar G", "Isopar H", "Isopar L", "Isopar M", "Naphtha No. 3", "Naphtha No. 5", or "Naphtha No. 6" manufactured by Exxon Mobile Chemical, "Solvent No. 7", "IP Solvent 1016", "IP Solvent 1620", "IP Solvent 2028", or "IP Solvent 2835" manufactured by Idemitsu Petrochemical Co., Ltd., "White Zol" manufactured by Japan Energy Corporation, "Marukazol 8" manufactured by Maruzen Petrochemical Co., Ltd. and the like.

Further, within the extent that effects of the present invention are maintained, other organic solvents may also be admixed to be used. For such organic solvents, aromatic hydrocarbons solvents such as "Swasol 100 or 150" manufactured by Maruzen Petrochemical Co. Ltd., toluene, xylene or the like; esters such as methyl acetate, ethyl acetate, n-butyl acetate, amyl acetate or the like; ketones such as acetone, methyl ethyl ketone, methyl isobutyl ketone, methyl amyl kethone, cyclohexanone or the like; or alcohols such as methanol, ethanol, n-propanol, i-propanol, n-butanol or the like may be listed, as concrete examples. When these solvents are used in combination, the amount of the aliphatic and/or alicyclic hydrocarbonic solvent used is preferably 50% by mass or more, and more preferably 60% by mass or more.

(Polymer (B) Soluble in Nonaqueous Solvents)

The polymer (B) which is soluble in the nonaqueous solvents used in the present invention preferably has said polymerizable unsaturated group since the polymer (B) is able to be polymerized or crosslinked with polymerizable unsaturated monomer (C) described later. For such polymers, acrylic resin (B-1) containing a polymerizable unsaturated group and an alkyd resin (B-2) soluble in nonaqueous solvents may be listed. Acrylic resin (B-1) containing a polymerizable unsaturated group and alkyd resin (B-2) soluble in nonaqueous solvents will be described in detail as follows as preferable embodiments of the polymer (B) soluble in the nonaqueous solvents.

(Acrylic Resin (B-1) Containing Polymerizable Unsaturated Group Soluble in Nonaqueous Solvents)

To be precise, the acrylic resin (B-1) containing polymerizable unsaturated group soluble in the nonaqueous solvents used in the present invention refers to a polymer which is formed by introducing a polymerizable unsaturated group to a copolymer of polymerizable unsaturated monomers which have, as a main component, alkyl (meth)acrylate having an alkyl group which has four or more carbon atoms, or refer to a macromonomer including a copolymer of polymerizable unsaturated monomers which have, as a main component, alkyl (meth)acrylate having an alkyl group which has four or more carbon atoms.

Examples of the alkyl (meth)acrylate having an alkyl group which has four or more carbon atoms include n-butyl (meth)acrylate, i-butyl (meth)acrylate, t-butyl (meth)acrylate, 2-ethylhexyl (meth)acrylate, lauryl (meth)acrylate, stearyl (meth)acrylate, isostearyl (meth)acrylate, cyclohexyl (meth)acrylate and the like.

Examples of usable polymerizable unsaturated monomers other than alkyl (meth)acrylate include aromatic vinyl monomers such as styrene, alpha-methylstyrene, p-t-butylstyrene, vinyl toluene or the like; (meth)acrylates such as benzyl (meth)acrylate, dimethylamino (meth)acrylate, diethylamino (meth)acrylate, dibromopropyl (meth)acrylate, tribromophenyl (meth)acrylate or the like; diesters derived from monovalent alcohol and unsaturated dicarboxylic acid such as maleic acid, fumaric acid, itaconic acid or the like; vinyl esters such as vinyl benzoic acid, "VeoVa" (a vinyl ester product of Shell Chemicals, Ltd., the Netherlands) or the like, and these may be used by being copolymerized with the aforementioned alkyl (meth)acrylates.

Monopolymer of these usable polymerizable unsaturated monomers other than alkyl (meth)acrylate has a low solubility in the nonaqueous solvents, so that it is preferable to be used as a random polymer with the alkyl (meth)acrylate. It is not preferable to use these monomers by copolymerizing them in block form or in graft form since block and graft copolymerization considerably lowers the solubility in the nonaqueous solvents.

These polymerizable unsaturated monomers may be used alone or in combination of two or more kinds. Among them, it is especially preferable to use a straight chain or a branched alkyl (meth)acrylate having an alkyl group which has 4 to 12 carbon atoms such as n-butyl (meth)acrylate, 2-ethylhexyl (meth)acrylate, lauryl methacrylate and the like.

A copolymer of polymerizable unsaturated monomers which have, as a main component, alkyl (meth)acrylate having an alkyl group, which has four or more carbon atoms, may be obtained by polymerizing the aforementioned polymerizable unsaturated monomers by common methods.

The acrylic resin (B-1) containing polymerizable unsaturated group may be obtained by introducing a polymerizable unsaturated group to the aforementioned copolymer of polymerizable unsaturated monomers which have, as a main component, alkyl (meth)acrylate having an alkyl group which has four or more carbon atoms.

Examples of methods for introducing polymerizable unsaturated group include: a method in which polymerizable monomers containing a carboxyl group such as acrylic acid, methacrylic acid and the like, and polymerizable monomers containing an amino group such as dimethylaminoethyl methacrylate, dimethylaminopropyl acrylamide and the like, are admixed in advance as copolymerizing elements and are copolymerized, thereby obtaining the aforementioned copolymer containing a carboxyl group and/or an amino group, and then the carboxyl group and/or the amino group thereof are subjected to react with monomers containing a glycidyl group and a polymerizable unsaturated group such as glycidyl methacrylate and the like;

a method in which polymerizable monomers containing hydroxyl group such as 2-hydroxyethyl methacrylate, 2-hydroxyethyl acrylate and the like are admixed in advance as copolymerizing elements and are copolymerized to thereby obtain the aforementioned copolymer containing a hydroxyl group, and then the hydroxyl group thereof is subjected to react with monomers containing an isocyanate group and a polymerizable unsaturated group such as isocyanatoethyl methacrylate and the like;

a method in which thioglycolic acid is used in apolymerization as a chain transfer agent so as to introduce a carboxyl group to the chain-end of the copolymer, and then the carboxyl group is subjected to react with monomers containing a glycidyl group and a polymerizable unsaturated group such as glycidyl methacrylate and the like; and a method in which azo initiator containing a carboxyl group such as azobis cyanopentanoic acid is used as a polymerization initiator so as to introduce a carboxyl group to copolymers, and then the carboxyl group is subjected to react with monomers containing a glycidyl group and a polymerizable unsaturated group such as glycidyl methacrylate and the like. Among these methods, it is most simple, easy and preferable to employ the method in which monomers containing a carboxyl group such as acrylic acid, methacrylic acid and the like, or monomers containing an amino group such as dimethylaminoethyl methacrylate, dimethylaminopropyl acrylamide and the like, are copolymerized in advance, and then the carboxyl group and/or the amino group thereof are subjected to react with monomers containing a glycidyl group and a polymerizable unsaturated group such as glycidyl methacrylate and the like.

(Alkyd Resin (B-2) Soluble in Nonaqueous Solvents)

The alkyd resin (B-2) soluble in the nonaqueous solvents used in the present invention is a condensate of a polybasic acid and a polyvalent alcohol modified by a fatty oil and/or a fatty acid. Acrylics and the like modified by vinyl, phenol, epoxy ester, silicon and the like are also known. According to the present invention, it is preferable to use an alkyd resin containing ample oil constituents because of its high solubility in nonaqueous solvents, and the use of a long oil alkyd resin is preferable. Further, from the viewpoint of reactivity upon polymerization of a polymerizable unsaturated monomer (C) described later, it is also preferable to use an acrylic modified alkyd resin. In the following description, a long oil alkyd resin is referred to as an alkyd resin (B-2-1) and an acrylic modified alkyd resin as an acrylic modified alkyd resin (B-2-2).

(Alkyd Resin (B-2-1))

To be concrete, examples of the alkyd resins (B-2-1) include those alkyd resins which can be obtained by conventional method wherein one or two more kinds of acids and one or two more kinds of alcohols are reacted using one or two or more kinds of oils or fatty acids. Examples of the oils and fatty acids include; those selected from the group consisting of saturated fatty acids such as an octylic acid, a laurilic acid, a stearic acid, "Versatic Acid" (a synthetic fatty acid manufactured by Shell) or the like, unsaturated fatty acids such as an oleic acid, a linolic acid, a linolenic acid, an eleostearic acid, a ricinolic acid, or the like, drying (or half-dry) oils (fatty acids) such as "Pamolyn 200 or 300" (a synthetic drying oil fatty acid manufactured by Hercules Inc., U.S.A.), Chinese wood oil (fatty acids), linseed oil (fatty acids), dehydrated castor oil (fatty acids), (tall oil (fatty acids), cotton seed oil (fatty acids), soybean oil (fatty acids), olive oil (fatty acids), safflower oil (fatty acids), castor oil (fatty acids), rice bran oil or the like (fatty acids), and non-drying oils (fatty acids) such as hydrogenated coconut oil fatty acids, coconut oil fatty acids, palm oil fatty acids or the like. Examples of the alcohols include; polyvalent alcohols such as ethylene glycol, propylene glycol, glycerine, trimethylol ethane, trimethylol propane, neopentyl glycol, 1,6-hexanediol, 1,2,6-hexanetriol, pentaerythritol, sorbitol or the like. Examples of the carboxylic acids include; benzoic acid, p-t-butyl benzoic acid, phthalic acid (anhydride), hexahydrophthalic acid (anhydride), tetrahydrophthalic acid (anhydride), tetrachlorophthalic acid (anhydride), hexachlorophthalic acid (anhydride), tetrabromophthalic acid (or anhydride), trimellitic acid, "Himic anhydride" (manufactured by Hitachi Chemical Co., Ltd.), succinic acid (anhydride), maleic acid (anhydride), fumaric acid, itaconic acid (anhydride), adipic acid, sebacic acid, oxalic acid or the like. If necessary, before the reaction, it is possible to replace a part of the aforementioned polyvalent alcohols and the carboxylic acids by conventional methods using following compounds. Examples of the compounds include; reactive silicone resins such as "Toray Silicone SH-6018" (manufactured by Toray Silicone Co., Ltd.), or "X-22-160AS, KR-212 or 213" (manufactured by Shinetsu Chemical Co., Ltd.); mono-epoxy compounds such as glycidyl esters of a fatty acid such as "Cardura E" (glycidyl esters of "Versatic Acid" mentioned above manufactured by Shell); polyepoxy compounds such as "Epiclon 200 or 400" (manufactured by DIC Corporation), or "Epicoat 828 or 1001" (manufactured by Shell); and diisocyanates such as tolylene diisocyanate, hexamethylene diisocyanate, isophorone diisocyanate, 4,4-methylenebis (cyclohexyl isocyanate) and the like; polyisocyanates obtained by an addition reaction between those diisocyanates and the aforementioned polyvalent alcohol and/or water; and polyisocyanates having an isocyanuric ring obtained by (co)polymerization of plurality of diisocyanates.

(Acrylic Modified Alkyd Resin (B-2-2))

The acrylic modified alkyd resin (B-2-2) specifically indicates a matter obtained by polymerizing a polymerizable unsaturated monomer in the presence of the above-described alkyd resin (B-2-1), or the resultant matter of an acrylic polymer grafting onto an alkyd resin by addition reaction or the like. For the polymerizable unsaturated monomers polymerized in this case, it is especially preferable, in view of high solubility in the nonaqueous solvents, to use an alkyl (meth)acrylate having an alkyl group which has four or more carbon atoms, such as n-butyl (meth)acrylate, butyl (meth)acrylate, t-butyl (meth)acrylate, 2-ethylhexyl (meth)acrylate, lauryl (meth)acrylate, stearyl (meth)acrylate, isostearyl (meth)acrylate, cyclohexyl (meth)acrylate and the like. The polymerizable unsaturated monomers may be used alone or in combination of two or more kinds. Among them, a straight chain or a branched alkyl (meth)acrylate having an alkyl group which has 4 to 12 carbon atoms such as n-butyl (meth)acrylate, 2-ethylhexyl (meth)acrylate, lauryl methacrylate and the like is especially preferable.

Further, within the extent that the solubility to the nonaqueous solvents is not lowered, aromatic vinyl monomers such as styrene, alpha-methylstyrene, p-t-butylstyrene, vinyl toluene or the like, (meth)acrylates such as benzyl (meth)acrylate, dimethylamino (meth)acrylate, diethylamino (meth)acrylate, dibromopropyl (meth)acrylate, tribromophenyl (meth)acrylate or the like, diesters derived from monovalent alcohol and unsaturated dicarboxylic acid such as maleic acid, fumaric acid, itaconic acid or the like, and vinyl esters such as vinyl benzoic acid, "VeoVa" (a vinyl ester product of Shell, the Netherlands) or the like, may be properly used by being copolymerized with the aforementioned alkyl (meth)acrylates.

Furthermore, for the acrylic resin to be grafted onto the alkyd resin (B-2-1), copolymer of polymerizable unsaturated monomers having, as a main component, alkyl (meth)acrylate, which has an alkyl group having four or more carbon atoms and which may produce the aforementioned polymerizable unsaturated monomers as main components, may be used preferably in the view of high solubility to the nonaqueous solvents.

(Polymerizable Unsaturated Monomers (C) Originally Soluble in Nonaqueous Solvents but Become Insoluble or Poorly Soluble after Polymerization)

Concrete examples of the polymerizable unsaturated monomers (C) which are originally soluble in the nonaqueous solvents but become insoluble or poorly soluble after polymerization include; vinyl monomers not having a so-called reactive polar group (functional group), such as methyl (meth)acrylate, ethyl (meth)acrylate, n-propyl (meth)acrylate or i-propyl methacrylate, or olefins such as (meth)acrylonitrile, vinyl acetate, vinyl chloride, vinylidene chloride, vinyl fluoride or vinylidene fluoride; amide bond-containing vinyl monomers such as (meth)acrylamide, dimethyl (meth)acrylamide, N-t-butyl (meth)acrylamide, N-octyl (meth) acrylamide, diacetone acrylamide, dimethylaminopropyl acrylamide or alkoxylated N-methylolated (meth)acrylamides; dialkyl [(meth)acryloyloxyalkyl]phosphates, (meth) acryloyloxyalkyl acid phosphates, dialkyl[(meth)acryloyloxyalkyl]phosphites or (meth)acryloyloxyalkyl acid phosphites; phosphorous atom-containing vinyl monomers such as 3-chloro-2-acid phosphoxypropyl (meth)acrylate, alkylene oxide addition products of the aforementioned (meth)acryloyloxy alkyl acid phosphates or acid phosphites, and ester compounds of epoxy group-containing vinyl monomers such as glycidyl (meth)acrylate or methylglycidyl (meth)acrylate and phosphoric acid, phosphorous acid or acidic esters thereof; hydroxyl group-containing polymerizable unsaturated monomers such as hydroxyalkyl esters of polymerizable unsaturated carboxylic acids or their addition products with ε-caprolactone such as 2-hydroxyethyl (meth) acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, 3-chloro-2-hydroxypropyl (meth)acrylate, di-2-hydroxyethylfumarate or mono-2-hydroxyethyl monobutyl fumarate, or polypropylene glycol or polyethylene glycol mono(meth) acrylate, or "PLACCEL FM or FA Monomer" (caprolactone addition monomer manufactured by Daicel Chemical Industries), unsaturated mono- and/or dicarboxylic acids such as (meth)acrylic acid, crotonic acid, maleic acid, fumaric acid, itaconic acid or citraconic acid, polymerizable unsaturated carboxylic acids such as monoesters of these dicarboxylic acids and monovalent alcohols, various types of unsaturated carboxylic acids in the manner of addition products of the aforementioned polymerizable unsaturated carboxylic acid hydroxy alkyl esters and anhydrides of polycarboxylic acids such as maleic acid, succinic acid, phthalic acid, hexahydrophthalic acid, tetrahydrophthalic acid, benzene tricarboxylic acid, benzene tetracarboxylic acid, "hymic acid", tetrachlorophthalic acid or dodecinyl succinic acid, butylglycidyl esters or monoglycidyl esters of monovalent carboxylic acids such as "Cardura E", coconut oil fatty acid glycidyl ester or octylic acid glycidyl ether, addition products of monoepoxy compounds such as ethylene oxide or propylene oxide, or their addition products with ε-caprolactone or hydroxy vinyl ether; dialkylaminoalkyl (meth)acrylates such as dimethylaminoethyl (meth)acrylate or diethylaminoethyl (meth) acrylate; epoxy group-containing polymerizable unsaturated monomers such as epoxy group-containing polymerizable compounds obtained by addition reactions at an equimolar ratio of various polyepoxy compounds having at least two epoxy groups in a molecule thereof, such as "EPICLON 200", "EPICLON 400", "EPICLON 441", "EPICLON 850" or "EPICLON 1050" (epoxy resins manufactured by DIC Corporation), or "Epicoat 828", "Epicoat 1001" or "Epicoat 1004" (epoxy resins manufactured by Japan Epoxy Resins Co., Ltd.), "Araldite 6071" or "Araldite 6084" (epoxy resins manufactured by Ciba-Geigy, Switzerland) or additionally "Chissonox 221" (epoxy resin manufactured by Chisso Corporation) or "Denacol EX-611" (epoxy resin manufactured by Nagase & Co., Ltd.), with various types of unsaturated carboxylic acids such as equimolar addition products of the aforementioned polycarboxylic acid anhydrides and hydroxyl group-containing vinyl monomers such as glycidyl meth(acrylate), (β-methyl)glycidyl (meth)acrylate, (meth)allyl glycidyl ether or polymerizable unsaturated carboxylic acids or mono-2-(meth)acryloyloxy monoethyl phthalate; isocyanate group-containing α,β-ethylenic unsaturated monomers such as 2-hydroxyethyl (meth)acrylate-hexamethylene diisocyanate equimolar addition products or monomers having an isocyanate group and vinyl group such as isocyanate ethyl(meth)acrylate; alkoxysilyl group-containing polymerizable unsaturated monomers such as silicon-based monomers such as vinyl ethoxysilane, α-methacryloxypropyl trimethoxysilane, trimethylsiloxyethyl (meth)acrylate or "KR-215, X-22-5002" (manufactured by Shin-Etsu Chemical Co., Ltd.); and carboxyl group-containing α,β-ethylenic unsaturated monomers such as α,β-ethylenic unsaturated carboxylic acids such as unsaturated mono- or dicarboxylic acids such as (meth)acrylic acid, crotonic acid, maleic acid, fumaric acid, itaconic acid or citraconic acid, and monoesters of said dicarboxylic acids and monovalent alcohols, or addition products of α,β-unsaturated carboxylic acid hydroxyalkyl esters such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, 3-chloro-2-hydroxypropyl (meth)acrylate, di-2-hydroxyethyl fumarate, mono-2-hydroxyethyl-monobutyl fumarate or polyethylene glycol mono(meth)acrylate, and anhydrides of polycarboxylic acids such as maleic acid, succinic acid, phthalic acid, hexahydrophthalic acid, tetrahydrophthalic acid, benzene tricarboxylic acid, benzene tetracarboxylic acid, "hymic acid", tetrachlorophthalic acid or dodecinyl succinic acid.

Among these, alkyl (meth)acrylates having C3 (3 carbon atoms) or less such as methyl (meth)acrylate, ethyl (meth)acrylate or the like are used preferably. Moreover, in order to change the surface properties of pigments so as to improve the interaction with a dispersing agent or pigment dispersing resin, polymerizable unsaturated monomers containing at least one kind of functional groups such as a carboxyl group, a sulfonic acid group, a phosphoric acid group, a hydroxyl group, a dimethylamino group or the like are preferably copolymerized.

Moreover, in order not to elute the polymer from the pigments when modified pigments are used, it is more preferable that the polymer be crosslinked. For the multifunctional polymerizable unsaturated monomers used as crosslinking components, divinylbenzene, ethylene glycol di(meth)acrylate, diethylene glycol di(meth)acrylate, triethylene glycol di(meth)acrylate, polyethylene glycol di(meth)acrylate, 1,3-butanediol di(meth)acrylate, 1,4-butanediol di(meth)acrylate, 1,6-hexanediol di(meth)acrylate, neopentyl glycol dimethacrylate, trimethylolpropane trietoxy tri(meth)acrylate, trimethylolpropane tri(meth)acrylate, pentaerythritol tri (meth)acrylate, pentaerythritol tetra(meth)acrylate, dipentaerythritol hexa(meth)acrylate, allyl methacrylate or the like may be listed, for example.

Further, other polymerizable unsaturated monomers may also be used within the extent that the polymer having at least one kind of, as essential components, the polymerizable unsaturated monomers (C) originally soluble in the nonaqueous solvent but become insoluble or poorly soluble after polymerization is kept insoluble in the nonaqueous solvents. For the other polymerizable unsaturated monomers, polymerizable unsaturated monomers besides the aforementioned alkyl (meth)acrylate having an alkyl group which has four or more carbon atoms and the above-described alkyl (meth) acrylate may be used.

The modified pigments used in the present invention are obtained by being polymerized in the presence of the pigment (A), the nonaqueous solvents, and the polymer (B) with at least one kind of the polymerizable unsaturated monomer (C) which is soluble in the nonaqueous solvents but becomes insoluble or poorly soluble after polymerization. The pigment (A) and the polymer (B) are preferably mixed before polymerization is carried out. Examples of mixing methods which can be used include a homogenizer, a dispersion mixer, a beads mill, a paint shaker, a kneader, a roll mill, a ball mill, an attoritor, a sand mill and the like. According to the present invention, pigments to be used can be in any forms of a slurry, a wet cake or a powder. That is, according to the manufacturing method of the present invention, a moisture-containing pigment such as a wet cake can be used.

After mixing the pigment (A) and the polymer (B), the polymerizable unsaturated monomer (C) and a polymerization initiator which will be described later are further admixed to be polymerized to thereby obtain the modified pigment.

Although on that occasion, the amount used of the polymer (B) is not particularly limited as it is properly optimized according to the purposes, 1 to 200 parts of the polymer (B) per 100 parts of the pigment (A) is generally used, and preferably from 5 to 50 parts, and more preferably from 5 to 30 parts may be used.

Moreover, although the amount of the polymerizable unsaturated monomer (C) used is also not particularly limited as it is properly optimized according to the purposes, 1 to 200 parts of the monomer (C) per 100 parts of the pigment (A) is generally used, and preferably from 5 to 50 parts, and more preferably from 5 to 30 parts may be used.

The amount of the polymer (P) finally coated on the pigment is preferably from 2 to 400 parts per 100 parts of the pigment (A), and more preferably from 10 to 100 parts, and most preferably from 10 to 60 parts. On that occasion, at least one kind of the polymerizable unsaturated monomer (C) is generally used in a range of 10 to 400 parts per 100 parts of the polymer (B), and preferably in a range of 30 to 400 parts, and more preferably in a range of 50 to 200 parts.

For polymerizing the polymerizable unsaturated monomer (C) in the presence of the pigment (A), the nonaqueous solvents, and the polymer (B), publicly known and widely employed methods for polymerization may be employed, and generally carried out in the presence of a polymerization initiator. As the polymerization initiator, a radical generating polymerization catalyst such as azobisisobutyronitrile (AIBN), 2,2-azobis(2-methylbutyronitrile), benzoyl peroxide, t-butyl perbenzoates, t-butyl-2-ethylhexanoate, t-butyl hydroperoxide, di-t-butyl peroxide, cumene hydroperoxide, or the like may be used alone or in combination of two or more kinds.

Since there are polymerization initiators which are not easily soluble in the nonaqueous solvents, methods in which the initiator is first dissolved in the polymerizable unsaturated monomer (C) and then added to the mixture of the pigment (A) and the polymer (B) are preferably employed.

Also, while the polymerizable unsaturated monomer (C) or the polymerizable unsaturated monomer (C) in which the polymerization initiator is dissolved can be added by using a dropping technique with the monomer reaching the polymerization temperature, the polymerization method in which the monomer is added in the state of the normal temperature before the temperature rises and then the temperature rises after the mixture is fully mixed, is preferably employed for its stability.

The polymerization temperature is generally in a range of 60° C. to 130° C. In the case where the pigment (A) is an organic pigment, if the polymerization temperature is too high, changes in form such as decomposition of the pigment or crystal growth might be remarkable, so that it is preferable to be polymerized in a range of 70 to 100° C. in that case.

After polymerization, the nonaqueous solvents or the like used in polymerization are removed by filteration, and the resultant substance is further dried and ground to thereby obtain modified pigments in a powdery form. For the filtering methods, a Nutsche filter, a filter press and the like can be used. For drying, publicly known drying apparatuses such as a chamber dryer, a vacuum dryer, a band dryer, a spray dryer or the like can be used. Moreover, for kneading, publicly known milling apparatuses such as a mortar, a hammer mill, a disc mill, a pin mill, a jet mill or the like can be used.

(Coloring Agent: Blending Amount)

While the blending amount of the modified pigment used in the present invention is not particularly limited, 3 to 70% by mass, converted to pigment concentration, is generally added based on ink solid content concentration. Further, within the extent that effects of the present invention are maintained, general-purpose pigments can be admixed to be used.

The active energy ray-curable ink using modified pigments according to the present invention has such a characteristic that the ink can achieve a higher color density compared with an ink using a pigment of the similar kind even though the ink has the same blending amount.

(Binder Resin)

The active energy ray-curable ink of the present invention is not particularly limited except the use of the modified pigment, so that it can be prepared by publicly known materials. To be more precise, besides the above-described modified pigment, a binder resin, a radically polymerizable varnish and/or a radically polymerizable monomer are contained as main components. When an ultraviolet ray or infrared ray is used as an active energy ray, a photopolymerization initiator is preferably used in combination.

As the binder resins, it is not particularly limited as long as those are the resins for printing ink which can be dissolved in the radically polymerizable varnish and/or the radically polymerizable monomer described later. Examples include oxygen curable alkyd resins, vehicles containing an oil-modified alkyd or a drying oil and a polymer such as those containing oil-modified epoxy resin and amino resin, alkyd and phenol resins, alkyd and nitro celluloses, alkyd and chlorinated rubbers, alkyd and polystyrenes, alkyd and diisocyanates, alkyd-vinyl and epoxy, alkyd and amino resins, and alkyd-amino resins and epoxy alkyd and silicones, and vehicles not containing an alkyd and a drying oil such as vinyl acetal and/or phenol resin, allylamino resin, epoxy, trimethylol phenyl ether, polyester, triazine resin, allyl polyester, silicone, thermosetting acrylic, mixed amino resin, vinyl acetate-vinyl chloride copolymer, polyvinylidene chloride, butadiene copolymer, polyvinyl acetate, polyamide resin, ester and ether salt of cellulose, poly (meth)acrylic resin, polyurethane resin, polytetrafluoroethylene, polyvinyl acetal, saturated polyester resin, petroleum resin, polystyrene, polyolefine, or the like.

(Radical Polymerizable Varnish and/or Radical Polymerizable Monomer)

For the radical polymerizable varnish and/or the radical polymerizable monomer used in the present invention, any of the publicly known (meth)acrylic monomers and/or (meth) acrylic oligomers generally used in active energy ray-curable inks can be selected arbitrarily to be used.

Examples of the (meth)acrylic monomers include unsaturated carboxylic acid such as acrylic acid or methacrylic acid or esters thereof, alkyl-, cycloalkyl-, halogenated alkyl-, alkoxyalkyl-, hydroxyalkyl-, aminoalkyl-, tetrahydrofurfuryl-, allyl-, glycidyl-, benzyl-, or phenoxy-(meth)acrylates, mono or di(meth)acrylate of polyoxyalkylene glycol or alkylene glycol, trimethylolpropane tri(meth)acrylate, penta erythrityl tetra (meth)acrylate, (meth)acrylic amide or a derivative thereof such as diaceton (meth)acrylamide, N,N'-alkylenebis (meth)acrylamide or (meth)acrylamide, which are mono-substituted or di-substituted by an alkyl group or a hydroxyalkyl group, and allyl compounds such as allyl alcohol, allyl isocyanate, diallyl phthalate, or triallyl isocyanurate.

Other examples of the (meth)acrylic monomers include polyethylene glycol (n thereof is 3 or more and approximately 14 or less) di(meth)acrylate, which have ethylene glycol units within the molecule, trimethylolpropane ethoxylated (n thereof is 3 or more and approximately 14 or less) tri(meth) acrylate, and phenol ethoxylated (n thereof is 3 or more and approximately 14 or less) modified (meth)acrylate, 2-hydroxyethyl (meth)acrylate having hydroxyl groups within the molecule, 2-hydroxypropyl (meth)acrylate, 4-hydroxybutyl (meth)acrylate, pentaerythritol tri(meth)acrylate, and phthalic acid monohydroxyethyl (meth)acrylate. These (meth)acrylic monomers may be used alone or in combination of two or more kinds.

Further, in the case of the usage in which shrinkage on curing becomes an obstacle, photopolymerizable monomers may be used. Examples thereof include: isobornyl (meth) acrylate, norbornyl (meth)acrylate, dicyclopentenoxyethyl (meth)acrylate, dicyclopentenoxypropyl (meth)acrylate, acrylic acid ester or methacrylic acid ester of diethylenglycol dicyclopentenyl monoether, acrylic acid ester or methacrylic acid ester of polyoxyethylene or polypropyleneglycol dicyclopentenyl monoether, dicyclopentenyl cinnamate, dicyclopentenoxyethyl cinnamate, dicyclopentenoxyethyl monofumarate or difumarate, mono- or diacrylate or mono- or dimethacrylate of 3,9-bis(1,1-bismethyl-2-oxyethyl)-spiro [5,5]undecane, 3,9-bis(1,1-bismethyl-2-oxyethyl)-2,4,8,10-tetraoxaspiro[5,5]undecane, 3,9-bis(2-oxyethyl)-spiro[5,5] undecane, 3,9-bis(2-oxyethyl)-2,4,8,10-tetraoxaspiro[5,5] undecane, mono- or diacrylate, or mono- or dimethacrylate of ethylene oxide or propylene oxide addition polymer of spino glycols of the aforementioned compounds, methyl ether of the aforementioned mono (meth)acrylate, 1-azabicyclo[2,2, 2]-3-octenyl(meth)acrylate, bicyclo[2,2,1]-5-heptene-2,3,dicarboxylic monoallyl ester, dicyclopentadienyl (meth)acrylate, dicyclopentadienyloxyethyl (meth)acrylate, and dihydrodicyclopentadienyl (meth)acrylate. These photopolymerizable monomers may be used alone or in combination of two or more kinds.

Examples of the (meth)acryl oligomers include; (meth) acrylic acid ester of an epoxy resin such as diglycidilether di(meth)acrylate of bisphenol A, reaction products of an epoxy resin, (meth)acrylic acid and anhydride of methyltetrahydrophthalic acid, reaction products of an epoxy resin and 2-hydroxyethyl (meth)acrylate, ring-opening copolymerized esters of glycidildi (meth)acrylate and phthalic anhydride, esters of methacrylic acid dimer and polyol, polyesters obtained from acrylic acid, phthalic anhydride and propylene oxide, reaction products of polyvinyl alcohol and N-methyrolacrylamide, unsaturated polyester prepolymers such as reaction products of polyethylene glycol, maleic anhydride and glycidil (meth)acrylate, polyvinyl alcohol prepolymers such as polyvinyl alcohol which is esterified with succinic anhydride and glycidilmethacrylate is added after the esterification, polyacrylic acid or maleic acid copolymer prepolymers such as reaction products of methylvinylether-maleic anhydride copolymer and 2-hydroxyethylacrylate and reaction products of said reaction products and glycidilmethacrylate, and urethane prepolymers wherein one of polyoxyalkylene segment and saturated polyester segment or both of these are combined via urethane bonding and acryloyl groups or methacryloyl groups exist on the both terminal ends thereof. For the (meth)acryl oligomers, those having a number average molecular weight of approximately 2000 to 30000 are suitable.

(Photopolymerization Initiator)

In the case in which the active energy ray-curable ink of the present invention is cured by ultraviolet rays, a photopolymerization initiator is utilized. As the photopolymerization initiator used in the present invention, publicly known conventional ones may be used and examples of the photopolymerization initiator are 1-hydroxy-cyclohexyl-phenyl-ketone, 2-hydroxy-2-methyl-1-phenyl-propane-1-one, 1-[4-(2-hydroxyethoxy)-phenyl]-2-hydroxy-methyl-1-propane-1-one, 2-methyl-1-[4-(methylthio)phenyl]-2-morpholinopropane-1-one, 2-benzyl-2-dimethylamino-1-(4-morpholinophenyl)-butanone-1-bis(2,6-dimethoxybenzoyl)-2,4,4-trimethyl-pentyl phosphine oxide-bis(2,4,6-trimethylbenzoyl)-phenyl phosphine oxide or the like. These photopolymerization initiators may be used alone or in combination of two or more kinds.

While the content of the photopolymerization initiators is not particularly limited, the initiators are generally blended in an amount of approximately 2 to 20% by mass.

While the mixing amount of the binder resin, the radical polymerizable varnish and/or the radical polymerizable monomer may be suitably decided according to the purpose and not particularly limited, the binder resin is generally used in a range of 5 to 50% by mass and the radical polymerizable varnish and/or the radical polymerizable monomer functioning as crosslinking components are in a range of 20 to 90% by mass. In the case that the viscosity and the like are adjusted, it is often adjusted by changing the amount of the radical polymerizable monomer. However, it is not limited thereto, and organic solvents may be added properly. The organic solvents may be anything that can sufficiently dissolve the aforementioned composition without damaging the substrate materials, and the suitable examples include ester solvents such as ethyl acetate, and aromatic solvents such as toluene or the like. The amount of the organic solvents used is arbitrary and is suitably decided according to the respective purposes. While the viscosity of the active energy ray-curable ink of the present invention differs according to the method used to apply the ink, when used in offset printing, for example, the ink used may generally have a tack value of approximately 3 to 20.

The active energy ray-curable ink according to the present invention can be manufactured by blending the aforementioned components using publicly known dispersers such as a roll mill, a beads mill, a dispersion mixer, a homomixer, a colloid mill, a ball mill, an attoritor, a sand mill, a planetary mixer or the like. Since the ink of the present invention shows particularly fine dispersibility of the modified pigments used therein, the ink can be dispersed without high shearing, and the ink having excellent dispersibility so as to be easily dispersed even by a disperser such as a planetary mixer or the like, for example, can be obtained.

The methods of applying the active energy ray-curable ink of the present invention are not particularly limited, and publicly known methods such as a roll coater, a gravure coater, a flexocoater, an offset printer, a screen printer or the like may be suitably adopted. Among these methods, when used in the offset printing, the effect of the ink of the present invention may be fully achieved due to the excellent printing property of the ink of the present invention, and therefore such a printing is preferable.

The substrate materials on which the ink is applied are not particularly limited, and papers, various kinds of plastics or the like may be used.

While the active energy rays used in the present invention refer to ionizing radiations such as ultraviolet rays, electron ray, X-ray, α-ray, β-ray and γ-ray, microwave, high frequency or the like, any type of energy may be used as long as it can generate radical active species, and visible rays, infrared rays and laser radiation may also be used. Examples of ultraviolet rays generator include an extra-high pressure mercury lamp, a high pressure mercury lamp, a medium pressure mercury lamp, a low pressure mercury lamp, a metal halide lamp, a xenon lamp, a carbon arc lamp, a helium cadmium laser, an YAG laser, an excimer laser, an argon laser and the like.

Furthermore, as the curing methods by electron rays, the radical polymerization initiator is not necessarily used. Examples of the usable electron rays include those of a Cockcroft-Walton type, van de Graaff type, a resonance transformer type or the like, and electron rays having an energy in a range of 50 keV to 1000 keV, and preferably in a range of 100 keV to 300 keV may be used.

EXAMPLES

The present invention will be illustrated with reference to the following examples. Unless otherwise stated, "part" and "%" are based on mass.

Synthesis of Resin

Reference Example 1

Synthesis of Acrylic Resin (B-1) Containing a Polymerizable Unsaturated Group Soluble in Nonaqueous Solvents 950 parts of butyl acetate were set in a four neck flask provided with a thermometer, a stirrer, a reflux condenser, and a nitrogen gas introducing pipe, and the temperature was raised to 80° C. When the temperature reached 80° C., a mixture consisting of 970 parts of butyl acrylate, 30 parts of methacrylic acid, and 7 parts of 2,2'-azobis(2-methylbutyronitrile) were dripped into the four neck flask over 4 hours. After the dripping finished, the temperature was raised to 90° C., and was maintained and the reaction was continued for 10 hours.

The temperature of the reaction solution was lowered to 50° C. and a solution, in which 0.2 part of t-butylpyrocatechol was dissolved in 20 parts of butyl acetate, was added, and 20 parts of glycidyl methacrylate and 3 parts of dimethylamino ethanol were further added, and then the temperature was raised to 80° C. The reaction was continued for 10 hours at the same temperature to thereby obtain an acrylic resin (B-1) containing a polymerizable unsaturated group soluble in nonaqueous solvents.

Reference Example 2

Synthesis of Alkyd Resin (B-2-1)

650 parts of soybean oil, 137 parts of pentaerythritol, and 0.15 part of lithium hydroxide were set in a four neck flask provided with a thermometer, a stirrer, a decanter, and a nitrogen gas introducing pipe, and the temperature was raised to 250° C. After transesterification was carried out while the temperature was maintained for 1 hour, the temperature was lowered to 200° C., and 240 parts of phthalic anhydride and 30 parts of xylene were added, and then the temperature was raised to 240° C. Under the xylene reflux, dehydration was carried out at the same temperature while the reaction was continued for approximately 5 hours until the acid value became 6, and then the resultant mixture was diluted with "LAWS" (manufactured by Shell Chemicals; aliphatic hydrocarbons solvent/aromatic hydrocarbons solvent=70/30) so as the non-volatile matter thereof to be 60%, to thereby obtain an alkyd resin (B-2-1) whose oil length was 65%.

Reference Example 3

Synthesis of Acrylic Modified Alkyd Resin (B-2-2)

A reaction solvent consisting of 750 parts of heptane and 100 parts of butyl acetate was set in a four neck flask provided with a thermometer, a stirrer, a reflux condenser, and a nitrogen gas introducing pipe, and the temperature was raised to 90° C. When the temperature reached 90° C., a reaction mixture consisting of 600 parts of butyl acrylate, 250 parts of isostearyl methacrylate, 250 parts of the alkyd resin (B-2-1) obtained by Reference Example 2, 10 parts of 2,2'-azobis(2-methylbutylonitril), and 50 parts of butyl acetate was dripped spending 5 hours. Even after dripping had finished, the temperature was maintained and the reaction was continued for 10 hours to thereby obtain an acrylic modified alkyd resin (B-2-2).

Synthesis of Modified Pigment

Reference Example 4

Synthesis of Modified Pigment (1)

As a pigment (A) to be used, 235 parts of a wet cake (pigment content: 43%) of "FASTGEN GREEN S" (a green pigment manufactured by DIC Corporation; denoted as pigment 1 in Table 1), 13 parts of the acrylic resin (B-1) obtained by Reference Example 1, 600 parts of 1.25 mm zirconia beads, and 300 parts of heptane, were put in a wide-mouthed bottle made of polyethylene, and were mixed by Paint Shaker (manufactured by Toyo Seiki Seisaku-sho, Ltd.) for 90 minutes. After being diluted with 200 parts of heptane, zirconia beads were removed to thereby prepare a pigment mixed liquid. 400 parts of the obtained pigment mixed liquid was set in a separable flask provided with a thermometer, a stirrer, a reflux condenser, and a nitrogen gas introducing pipe, and then a mixture, in which 1.6 parts of 2,2'-azobis(2-methylbutylonitril) was dissolved in a polymerizable monomer composition of 2.8 parts of methyl methacrylate and 5.2 parts of ethylene glycol dimethacrylate, was added together with 250 parts of heptane. After stirring for 30 minutes at room temperature, the temperature was raised to 80° C., and the reaction was continued at the same temperature for 15 hours. By carrying out filtration after the temperature fell, the polymer-treated pigment and the polymerization solvent were separated. The resultant polymer pigment was dried by a hot air dryer at 100° C. for 5 hours, and was then ground by a grinder to thereby obtain a modified pigment (1).

Reference Examples 5 to 8

Synthesis of Modified Pigments (2) to (5)

Pigment mixed liquid was prepared according to the same manner as that in Reference Example 4 except that the pigment (A) used was changed as shown in Table 1. By using 400 parts of the obtained pigment mixed liquid, modified pigments (2) to (5) were obtained according to the same manner as that in Reference Example 4 except that the polymerizable monomer (C) was changed as shown in Table 1.

TABLE 1

| | Table 1 | | Reference Example 4 Modified Pigment (1) | Reference Example 5 Modified Pigment (2) | Reference Example 6 Modified Pigment (3) | Reference Example 7 Modified Pigment (4) | Reference Example 8 Modified Pigment (5) |
|---|---|---|---|---|---|---|---|
| Pigment Mixed Liquid | Acrylic Resin (B-1) | Amount of Use | 13 | 13 | 13 | 13 | 13 |
| | Nonaqueous Solvent on Dispersion | heptane | 300 | 300 | 300 | 300 | 300 |
| | Pigment (A) | Kind | Pigment 1 | Pigment 2 | Pigment 3 | Pigment 4 | Pigment 5 |
| | | Amount of Use | 235 | 205 | 250 | 100 | 100 |
| | 1.25 mm-zirconia beads | | 600 | 600 | 600 | 600 | 600 |
| | Nonaqueous Solvent on Taking Out | heptane | 200 | 200 | 200 | 200 | 200 |
| Polymerizable Monomer Composition (C) | | methyl methacrylate | 2.8 | 5.6 | 5.6 | 3.3 | 6.6 |
| | | ethylene glycol dimethacrylate | 5.2 | 10.4 | 5.2 | 6.1 | 1.2 |
| | | heptane | 250 | 250 | 250 | 250 | 250 |
| Polymerization Initiator | | 2,2'-azobis(2-methyl butyronitrile) | 1.6 | 3.2 | 3.2 | 1.9 | 3.7 |

Pigment 1: FASTGEN GREEN S (wet cake) C. I. Pigment Green 7 (a green pigment manufactured by DIC Corporation) 43% of pigment content
Pigment 2: FASTGEN BLUE TGR (wet cake) C. I. Pigment Blue 15:3 (a blue pigment manufactured by DIC Corporation) 49% of pigment content
Pigment 3: CARMINE 6B300 (wet cake) C. I. Pigment Red 57:1(a red pigment manufactured by DIC Corporation) 40% of pigment content
Pigment 4: Symuler FAST Yellow 4306 (powder) C. I. Pigment Yellow 13 (an yellow pigment manufactured by DIC Corporation)
Pigment 5: MA11 (powder) Carbon Black: (Mitsubishi chemical corporation)

Reference Example 9

Synthesis of Modified Pigment (6)

208 parts of a wet cake (pigment content: 48%) of FASTGEN BLUE FGF (a blue pigment product of DIC Corporation), 40 parts of the alkyd resin (B-2-1) obtained by Reference Example 2, 600 parts of zirconia beads having a diameter of 1.25 mm, and 300 parts of Isopar C were put in a wide-mouthed bottle made of polyethylene, and were mixed for 60 minutes by Paint Shaker (Toyo Seiki Seisaku-sho, Ltd.). After being diluted with 200 parts of Isopar C, zirconia beads were removed to thereby prepare a pigment mixed liquid.

400 parts of the obtained pigment mixed liquid was set in a separable flask provided with a thermometer, a stirrer, a reflux condenser, and a nitrogen gas introducing pipe, and then a mixture, in which 1.8 parts of t-butyl peroxy-2-ethylhexanoate was dissolved in a polymerizable monomer composition of 2.7 parts of ethyl acrylate, 1.1 parts of methacrylic acid, and 1.6 parts of ethylene glycol dimethacrylate, was added together with 200 parts of Isopar C. After stirring for 30 minutes at room temperature, the temperature was raised to 80° C., and the reaction was continued at the same temperature for 15 hours. By carrying out filtration after the temperature fell, the polymer-treated pigment and the polymerization solvent were separated. The resultant modified pigment was dried by a hot air dryer at 100° C. for 5 hours, and was then kneaded by a kneader to thereby obtain a modified pigment (6).

Reference Example 10

Synthesis of Modified Pigment (7)

100 parts of powder of FASTGEN BLUE FGF (a blue pigment product of DIC Corporation), 20 parts of the alkyd resin (B-2-2) obtained according to Reference Example 3, 600 parts of 1.25 mm-zirconia beads, and 300 parts of heptane were put in a wide-mouthed bottle made of polyethylene, and were mixed for 60 minutes by Paint Shaker (Toyo Seiki Seisaku-sho, Ltd.). After being diluted with 200 parts of heptane, zirconia beads were removed to thereby prepare a pigment mixed liquid.

400 parts of the obtained pigment mixed liquid was set in a separable flask provided with a thermometer, a stirrer, a reflux condenser, and a nitrogen gas introducing pipe, and then a mixture, in which 1.5 parts of 2,2'-azobis(2-methylbutylonitril) was dissolved in a polymerizable monomer composition of 2.6 parts of methyl methacrylate, 1.9 parts of dimethylamino ethyl methacrylate, and 1.9 parts of neopentyl glycol dimethacrylate, was added together with 200 parts of heptane. After stirring for 30 minutes at room temperature, the temperature was raised to 80° C., and the reaction was continued at the same temperature for 15 hours. By carrying out filtration after the temperature fell, the polymer-treated pigment and the polymerization solvent were separated. The resultant modified pigment was dried by a hot air dryer at 100° C. for 5 hours, and was then ground by a grinder to thereby obtain a modified pigment (7).

Method for Producing Ink Composition

Example 1

22 parts of the modified pigment (1) obtained in Reference Example 4, 36 parts of dipentaerythritol hexaacrylate (abbreviated as DPHA hereinafter), 14 parts of ditrimethylolpropane tetraacrylate (abbreviated as DTMPTA hereinafter), 0.5 part of hydroquinone, 20 parts of diallylphthalate resin (abbreviated as DAP hereinafter), and 5 parts of Dyecure PI Base (photopolymerization initiator manufactured by DIC Corporation) were mixed and kneaded by being passed twice through the rolls of a three roll mill to thereby obtain an active energy ray-curable ink composition (1).

Example 2

22 parts of the modified pigment (1) obtained in Reference Example 4, 36 parts of DPHA, 14 parts of DTMPTA, 0.5 part of hydroquinone, 20 parts of DAP, and 5 parts of Dyecure PI Base were mixed and kneaded by a planetary mixer for 5 hours to obtain an active energy ray-curable ink composition (2).

Examples 3 to 6

Active energy ray-curable ink compositions (3) to (6) were obtained in the same manner as that in Example 2 except that the pigment to be used and the mixing proportion of ink were changed as shown in Table 2.

Comparative Example 1

22 parts of FASTGEN GREEN S, 36 parts of DPHA, 14 parts of DTMPTA, 0.5 part of hydroquinone, 20 parts of DAP, and 5 parts of Dyecure PI Base were mixed and kneaded by being passed four times through the rolls of a three roll mill to thereby obtain an active energy ray-curable ink composition (H-1).

Comparative Examples 2 to 5

Active energy ray-curable ink compositions (H-2) to (H-5) were obtained in the same manner as that in Comparative Example 1 except that the pigment to be used and the mixing proportion of ink were changed as shown in Table 3.

TABLE 2

| | Table 2 | Example 1 | Example 2 | Example 3 | Example 4 | Example 5 | Example 6 |
|---|---|---|---|---|---|---|---|
| | Name of Ink Composition | Ink Composition (1) | Ink Composition (2) | Ink Composition (3) | Ink Composition (4) | Ink Composition (5) | Ink Composition (6) |
| Mixing Proportion of Ink | Pigment Used | Modified Pigment (1) | Modified Pigment (1) | Modified Pigment (2) | Modified Pigment (3) | Modified Pigment (4) | Modified Pigment (5) |
| | Amount of Pigment Used | 22 | 22 | 20 | 20 | 15 | 15 |
| | Pigment %/Total Amount of Ink | 18 | 18 | 16 | 16 | 13 | 12 |
| | DPHA | 36 | 36 | 42 | 42 | 45 | 45 |
| | DTMPTA | 14 | 14 | 14 | 14 | 15 | 15 |
| | DAP | 20 | 20 | 22 | 22 | 24 | 24 |
| | hydroquinone | 0.5 | 0.5 | 0.5 | 0.5 | 0.5 | 0.5 |

TABLE 2-continued

| Table 2 | | Example 1 | Example 2 | Example 3 | Example 4 | Example 5 | Example 6 |
|---|---|---|---|---|---|---|---|
| | Polymerization Initiator | 5 | 5 | 5 | 5 | 5 | 5 |
| | Kneading Method | 3 Roll Mill 2 pass | Planetary Mixer 5 hours | Planetary Mixer 5 hours | Planetary Mixer 5 hours | Planetary Mixer 5 hours | Planetary Mixer 5 hours |

TABLE 3

| | Table 3 | Comparative Example 1 | Comparative Example 2 | Comparative Example 3 | Comparative Example 4 | Comparative Example 5 |
|---|---|---|---|---|---|---|
| | Name of Ink Composition | Ink Composition (H-1) | Ink Composition (H-2) | Ink Composition (H-3) | Ink Composition (H-4) | Ink Composition (H-5) |
| Mixing Proportion of Ink | Pigment used (C) | FASTGEN GREEN S | FASTGEN BLUE TGR | CARMINE 6B300 | Simla FAST Yellow 4306 | MA11 |
| | Amount of Pigment Used | 22 | 20 | 20 | 15 | 15 |
| | Pigment %/Total Amount of Ink | 22 | 20 | 20 | 15 | 15 |
| | DPHA | 36 | 36 | 36 | 36 | 36 |
| | DTMPTA | 14 | 16 | 16 | 21 | 16 |
| | DAP | 20 | 20 | 20 | 20 | 25 |
| | hydroquinone | 0.5 | 0.5 | 0.5 | 0.5 | 0.5 |
| | Polymerization Initiator | 5 | 5 | 5 | 5 | 5 |
| Kneading Method | | 3 Roll Mill 4 pass | 3 Roll Mill 4 pass | 3 Roll Mill 4 pass | 3 Roll Mill 4 pass | 3 Roll Mill 4 pass |

(Evaluation of Pigment Dispersibility)

The obtained ink compositions were applied to a glass plate by an applicator, and were observed by a microscope (a product of Keyence Corporation). The dispersibilities of the ink compositions were also measured by using a grind meter. "0" in the streak gauge indicates satisfactory dispersibility. The results are shown in Tables 4 and 5.

TABLE 4

| Table 4 | Example 1 | Example 2 | Example 3 | Example 4 | Example 5 | Example 6 |
|---|---|---|---|---|---|---|
| Name of Ink Composition | Ink Composition (1) | Ink Composition (2) | Ink Composition (3) | Ink Composition (4) | Ink Composition (5) | Ink Composition (6) |
| Result of Microscope | No grain, fine | No grain, fine | No grain, fine | No grain, fine | No grain, fine | — |
| Streak Gauge | 0 | 0 | 0 | 0 | 0 | 0 |

TABLE 5

| Table 5 | Comparative Example 1 | Comparative Example 3 |
|---|---|---|
| Name of Ink Composition | Ink Composition (H-1) | Ink Composition (H-3) |
| Result of Microscope | Grain remains, uneven | No grain, fine |
| Streak Gauge | 11 | 2.5 |

Since the ink composition obtained in Example 1 had been kneaded by being passed twice through the three rolls, the value of streak gauge was "0", indicating an excellent dispersibility. While Examples 2 to 6 are the examples in which a planetary mixer was used as the kneading method, respective resultant values of the streak gauge were "0", indicating a satisfactory dispersibility, and it was confirmed that the resultant ink compositions could easily be dissolved. On the other hand, in Comparative Example 1, a pigment of the same kind as the one used in Example 1 was used to form an ink without being modified. Although the ink composition was kneaded by being passed four times through the three rolls, the value of the streak gauge was 11, so that it was confirmed that the resultant ink composition had an inferior dispersibility. Further, in Comparative Example 3, a pigment of the same kind as the modified pigment (4) used in Example 4 was used to form an ink without being modified. Although the ink composition was kneaded by being passed four times through the three rolls, the value of the streak gauge was 2.5, so that it was confirmed that the resultant ink composition had an inferior dispersibility.

Evaluation of Color Density of Ink Compositions

Example 7

25.4 parts of the modified pigment (1) obtained in Reference Example 4, 36.3 parts of DPHA, 14 parts of DTMPTA, 0.5 part of hydroquinone, 18.3 parts of DAP, and 5 parts of Dyecure PI Base were mixed and kneaded by being passed three times through the rolls of a three roll mill to thereby obtain an active energy ray-curable ink composition (7).

Printing of the ink composition (7) was performed by using a simple color printing device (an RI Tester: a product of Houei Seikou, Co., Ltd.), and was cured by an ultraviolet irradiation device (120 W, 1 lamp of metal halide lamp) to thereby obtain a printed matter (7-1). Printing of the ink composition (7) was also performed onto a woodfree paper by using a steel spatula, and was cured by an ultraviolet irradiation device (120 W, 1 lamp of metal halide lamp) to thereby obtain a printed matter (7-2). Respective densities of cyan (OD values) of the printed matters (7-1) and (7-2) were measured by SpectroEye (a product of GretagMacbeth), and the OD value of the printed matter (7-1) was 2.80 and of the printed matter (7-2) was 2.34. Further, 60 degree gloss of the printed matter (7-1) was measured with a haze-gloss meter (a product of BYK-Gardner) and the result was 80.

Example 8

22 parts of the modified pigment (1) obtained in Reference Example 4, 36 parts of DPHA, 18 parts of DTMPTA, 0.5 part of hydroquinone, 18 parts of DAP, and 5 parts of Dyecure PI Base were mixed and kneaded by a planetary mixer for 5 hours to thereby obtain an active energy ray-curable ink composition (8).

In the same manner as Example 7, printing of the ink composition (8) was performed onto a wood free paper by using a steel spatula, and was cured by an ultraviolet irradiation device (120 W, 1 lamp of metal halide lamp) to thereby obtain a printed matter (8-2). The density of cyan (OD value) of the printed matter (8-2) was measured by SpectroEye (a product of GretagMacbeth), and the OD value was 2.00.

Comparative Example 6

In the same manner as Example 7, printing of the ink composition (H-1) obtained in Comparative Example 1 was performed by using a simple printing device (an RI Tester: a product of Houei Seikou, Co., Ltd.), and was cured by an ultraviolet irradiation device (120 W, 1 lamp of metal halide lamp) to obtain a printed matter (H-1-1). Then, 60 degree gloss thereof was measured with a haze-gloss meter (a product of BYK-Gardner), and the result was 60.

Further, in the same manner as Example 7, printing of the ink composition (H-1) was also performed onto a woodfree paper by using a steel spatula, and was cured by an ultraviolet irradiation device to obtain a printed matter (H-1-2).

Respective optical densities of cyan (OD values) of the printed matters (H-1-1) and (H-1-2) were measured by SpectroEye (a product of GretagMacbeth), and the OD value was 2.31 and 2.00, respectively.

The results of Examples 7 and 8 and of Comparative Example 6 are shown in Table 6.

TABLE 6

| Table 6 | | Example 7 | Example 8 | Comparative Example 6 |
|---|---|---|---|---|
| Mixing Composition of Ink | Pigment Type | Modified Pigment (1) | Modified Pigment (1) | FASTGEN GREEN S |
| | Used Amount of Pigment | 25.4 | 22 | 22 |
| | Pigment %/Total Amount of Ink | 22 | 18 | 22 |
| | DPHA | 36.3 | 36 | 36 |
| | DTMPTA | 14 | 18 | 14 |
| | DAP | 18.3 | 18 | 20 |
| | hydroquinone | 0.5 | 0.5 | 0.5 |
| | Polymerization Initiator | 5 | 5 | 5 |
| Kneading Method | | 3 Roll Mill 3 pass | Planetary Mixer 5 hours | 3 Roll Mill 4 pass |
| Result of RI Tester | Optical Density of cyan (OD Value) | Printed Matter (7-1) 2.80 | — | Printed Matter (H-1-1) 2.31 |
| | Color Difference with Comparative Example 2 | +0.49 | — | — |
| | 60° gloss | 80 | — | 60 |

TABLE 6-continued

| Table 6 | | Example 7 | Example 8 | Comparative Example 6 |
|---|---|---|---|---|
| Spatula Drawing | Optical Density of cyan (OD Value) | Printed Matter (7-2) 2.34 | Printed Matter (8-2) 2.00 | Printed Matter (H-1-2) 2.00 |
| | Color Difference with Comparative Example 6 | +0.34 | ±0 | — |

The ink composition used in Example 7 had the same concentration of pigments in the ink composition of 22% as the ink composition used in Comparative Example 6. However, the printed matters (7-1) and (7-2) obtained in Example 7 showed a positive color difference compared with the printed matters (H-1-1) and (H-1-2) obtained in Comparative Example 6. That is, in Example 7, printed matters with higher color density than those obtained in Comparative Example 6 were able to be obtained.

Moreover, the ink composition used in Example 8 shows a lower concentration of pigments in the ink composition compared with the ink composition used in Comparative Example 6 (18% while 22% in the one used in Comparative Example 6). However, the printed matter (8-2) obtained in Example 8 shows a color difference of 0 compared with the printed matter (H-1-2) obtained in Comparative Example 6, so that it is clear that the printed matters of equivalent color densities can be obtained.

Examples 9 to 12

In the same manner as Example 7, printing of the ink compositions (3) to (6) obtained in Examples 3 to 6 were performed by a simple printing device (an RI Tester: a product of Houei Seikou, Co., Ltd.), and were cured by ultraviolet irradiation device (120 W, 1 lamp of metal halide lamp) to thereby obtain printed matters, and then the OD values and gloss were measured and evaluated respectively.

Comparative Examples 7 to 10

In the same manner as Example 7, printing of the ink compositions (H-2) to (H-5) obtained in Comparative Examples 2 to 5 were performed by a simple printing device (an RI Tester: a product of Houei Seikou, Co., Ltd.), and were cured by an ultraviolet irradiation device (120 W, 1 lamp of metal halide lamp) to thereby obtain printed matters, and then the OD values and gloss were measured and evaluated.

The results of Examples 9 to 12 and of Comparative Examples 7 to 10 are shown in Table 7.

TABLE 7

| Table 7 | | Example 9 | Example 10 | Example 11 | Example 12 | Comparative Example 7 | Comparative Example 8 | Comparative Example 9 | Comparative Example 10 |
|---|---|---|---|---|---|---|---|---|---|
| Type of Ink Composition | | Ink Composition (3) | Ink Composition (4) | Ink Composition (5) | Ink Composition (6) | Ink Composition (H-2) | Ink Composition (H-3) | Ink Composition (H-4) | Ink Composition (H-5) |
| Result of RI Tester | OD Value (cyan) | 2.35 | — | — | — | 2.31 | — | — | — |
| | OD Value (magenta) | — | 2.23 | — | — | — | 2.17 | — | — |
| | 60° gloss | 76 | 65 | 93 | 101 | 64 | 54 | 86 | 61 |

Printing Property

Example 13

By using the active energy ray-curable ink composition (8) obtained in Example 8, printing was carried out with a sheet-fed printer R702 manufactured by Roland Co., which is equipped with an ultraviolet irradiation device (160 W, 3 lamps of metal halide lamp), on 3000 sheets of coat paper (57.5 Kg/full size paper of A format: a product of Oji Paper Co., Ltd.) with a printing speed of 9000 sheets/hour to thereby obtain a printed matter.

Then, the following printing properties were evaluated.

1. Gloss of the printed matter
2. Plate remaining
3. Blanket remaining
4. Dampening roller remaining For the gloss of the printed matter, the 20 and 60 degree gloss of the 3000th printed matter were measured with a haze-gloss meter (a product of BYK-Gardner).

Properties 2. to 4. were evaluated in 4 levels from ⊚ to X (⊚ excellent; ○ good; Δ fair; X bad). Here, "remaining" indicates the existence of residual ink adhered to respective parts of the printer, and respective marks signify as: ⊚—no ink remains at all; ○—hardly no ink remains; Δ—a little ink remains; and X—a large amount of ink remains.

Comparative Example 11

22 parts of FASTGEN GREEN S, 36 parts of DPHA, 15.5 parts of DTMPTA, 0.5 part of hydroquinone, 20 parts of DAP, and 5 parts of Dyecure PI Base were mixed and kneaded by being passed four times through the rolls of a three roll mill to thereby obtain an active energy ray-curable ink composition (H-11).

By using the ink composition (H-11), printing was carried out with a sheet-fed printer R702 manufactured by Roland Co., which is equipped with an ultraviolet irradiation device (160 W, 3 lamps of metal halide lamp), on 3000 sheets of coat paper (57.5 Kg/full size paper of A format: a product of Oji Paper Co., Ltd.) with a printing speed of 9000 sheets/hour. After printing, the printed matter obtained thereby was evaluated in the same manner as Example 13. The results of Example 13 and of Comparative Example 11 are shown in Table 8.

TABLE 8

| Table 8 | | | Example 13 | Comparative Example 11 |
|---|---|---|---|---|
| Mixing Proportion of Ink | Pigment Type | | Modified Pigment (1) | FASTGEN GREEN S |
| | Used Amount of Pigment | | 22 | 22 |
| | Pigment %/Total Amount of Ink | | 18 | 22 |
| | DPHA | | 36 | 36 |
| | DTMPTA | | 18 | 15.5 |
| | DAP | | 18 | 20 |
| | hydroquinone | | 0.5 | 0.5 |
| | Polimalization Initiator | | 5 | 5 |
| Kneading Method | | | Planetary Mixer 5 hours | 3 Roll Mill 4 pass |
| Viscosity (Pa · s) | | | 20 | 21 |
| 1. Gloss of Printed Matter | | 20° | 7.8 | 4.7 |
| | | 60° | 48 | 37 |
| 2. Plate Remaining | | | ⊚ | ○ |
| 3. Blanket Remaining | | | ⊚ | Δ |
| 4. Dampening Roller Remaining | | | ⊚ | ○ |

It is clear from the results described above that the active energy ray-curable inks of the present invention using the modified pigments are excellent in color density and gloss, and have excellent printing properties.

The invention claimed is:

1. An active energy ray-curable ink composition comprising a coloring agent, a binder resin, and a radically polymerizable varnish and/or a radically polymerizable monomer as main components; wherein said coloring agent is a modified pigment obtained by polymerization, wherein a pigment (A), a nonaqueous solvent and an acrylic resin (B-1) containing a polymerizable unsaturated group are mixed to form a mixture, and at least one kind of polymerizable unsaturated monomer (C), which is a multifunctional polymerizable unsaturated monomer, is further mixed to the mixture to form a polymer on the pigment (A), wherein the polymer is obtained by cross-linking between the acrylic resin (B-1) and the multifunctional polymerizable unsaturated monomer, or cross-linking between the acrylic resin (B-1) and a polymer generated by polymerization of the multifunctional polymerizable unsaturated monomer.

2. The active energy ray-curable ink composition according to claim 1, wherein the acrylic resin (B-1) is a polymer which is formed by introducing a polymerizable unsaturated group to a copolymer of polymerizable unsaturated monomers which have, as a main component, alkyl (meth)acrylate having an alkyl group which has four or more carbon atoms; or a macromonomer which is a copolymer of polymerizable unsaturated monomers which have, as a main component, alkyl (meth)acrylate having an alkyl group which has four or more carbon atoms.

3. The active energy ray-curable ink composition according to claim 1, wherein the nonaqueous solvent includes an aliphatic solvent and/or an alicyclic hydrocarbonic solvent.

4. A printed matter which has a coating film obtained by curing and drying the active energy ray-curable ink composition according to claim 1.

5. The active energy ray-curable ink composition according to claim 2, wherein the nonaqueous solvent includes an aliphatic solvent and/or an alicyclic hydrocarbonic solvent.

6. A printed matter which has a coating film obtained by curing and drying the active energy ray-curable ink composition according to claim 2.

7. The active energy ray-curable ink composition according to claim 1, wherein the polymer (B) is soluble in the nonaqueous solvent.

8. The active energy ray-curable ink composition according to claim 1, wherein the monomer (C) is originally soluble in the nonaqueous solvent but becomes insoluble or poorly soluble after polymerization thereof.

9. The active energy ray-curable ink composition according to claim 1, wherein the pigment (A), on which the polymer is formed, is dried to form the modified pigment.

10. The active energy ray-curable ink composition according to claim 1, wherein cross-linking between the acrylic resin (B-1) and the multifunctional polymerizable unsaturated monomer or cross-linking between the acrylic resin (B-1) and a polymer generated by polymerization of the multifunctional polymerizable unsaturated monomer is performed at a temperature in a range of 60 to 130° C.

11. The active energy ray-curable ink composition according to claim 1, wherein the amount of the polymer formed on the pigment is from 2 to 400 parts per 100 parts of the pigment (A).

12. The active energy ray-curable ink composition according to claim 1, wherein the ink composition include 5 to 50% by mass of the binder resin, and 20 to 90% by mass of both of or one of the radical polymerizable varnish and the radical polymerizable monomer.

* * * * *